No. 713,371. Patented Nov. 11, 1902.
J. H. ADAMS.
FISHING REEL.
(Application filed Jan. 29, 1902.)
(No Model.)

Witnesses
Harry H. Walton
Francis L. Patton jr.

Inventor
John Howard Adams
By his Attorney
Alexander C. Proudfit.

THE NORRIS PETERS CO., PHOTO-LITHO., WASHINGTON, D. C.

UNITED STATES PATENT OFFICE.

JOHN HOWARD ADAMS, OF WESTPARK, NEW YORK.

FISHING-REEL.

SPECIFICATION forming part of Letters Patent No. 713,371, dated November 11, 1902.

Application filed January 29, 1902. Serial No. 91,759. (No model.)

*To all whom it may concern:*

Be it known that I, JOHN HOWARD ADAMS, of Westpark, New York, have invented certain Improvements in Fishing-Reels, of which the following description, in connection with the accompanying drawings, is a specification, like figures on the drawings designating like parts.

This invention has for its object the production of an actuating device for fishing-reels, and particularly for fishing-reels of the powerful type used in fishing for tuna, tarpon, and other fish of the kind requiring powerful winding mechanism with capacity for paying out the line readily.

My improvements are directed toward means for enabling a rapid and automatic transition from the low power sufficient for winding in the line rapidly in the absence of tension upon it to a greater leverage and power capable of overcoming the drag exerted by the heavy type of fish instanced above.

I have embodied these improvements in a handle or attachment capable of being secured in place of standard types of handles without altering and distorting the structure, the parts of my improved handle being so disposed as to balance, thus affording a handle as easily operated as any in use.

The various features of my invention will be illustrated and described fully in the accompanying drawings and specification and pointed out in the claims.

Figure 1:
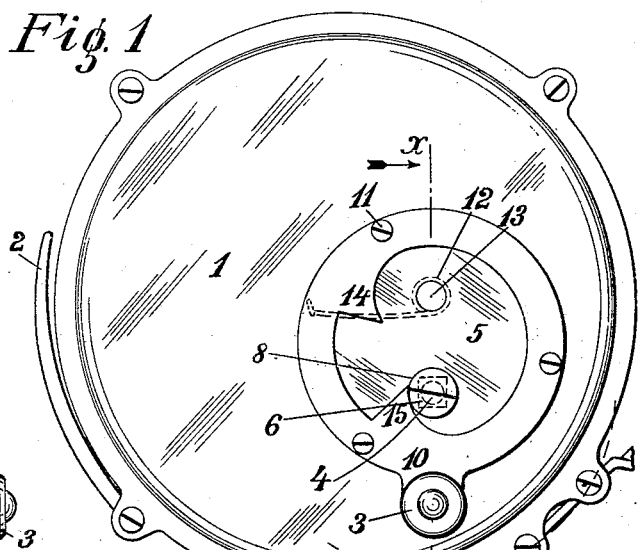
Figure 2:
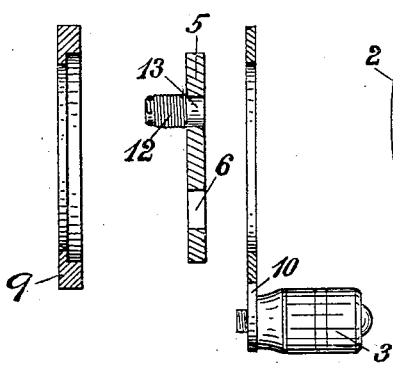
Figure 4:
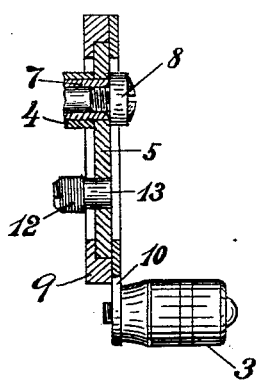
Figure 3:
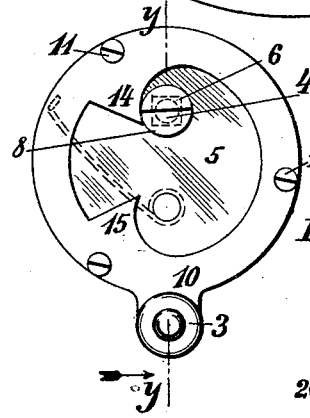
Figure 5:
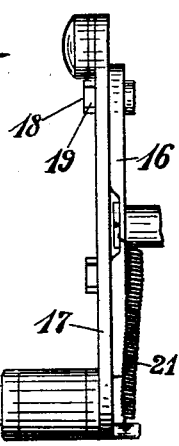
Figure 6:
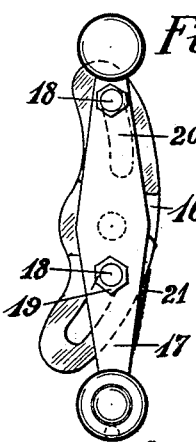
Figure 7:
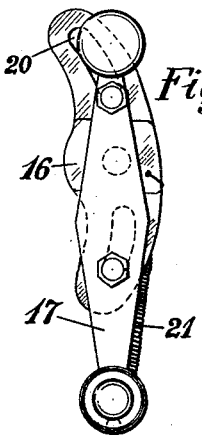

In the drawings, Figure 1 is a view in side elevation, illustrating a fishing-reel provided with a handle in the construction of which my improvements have been embodied. Fig. 2 is a view showing the parts of said handle in section on the line $x$ $x$, Fig. 1, but separated from each other. Fig. 3 is a view of the handle similar to Fig. 1, but showing the parts in their position of increased leverage. Fig. 4 is a view in section on the line $y$ $y$, Fig. 3. Fig. 5 is a view in side elevation of a modified form of handle, Fig. 6 being a face elevation of the modified handle and Fig. 7 a similar view with the parts in position for increased leverage.

In the embodiment of my invention selected for illustration and description as a convenient form to enable a ready and complete understanding of my improvements, referring to Figs. 1 to 4, the part designated by the reference-numeral 1 is a fishing-reel, which may be of any convenient type and is shown as having a common form of drag 2, against which the thumb or thumbs of the operator are applied when the line is running out rapidly, the drag being pressed against the fishing-line upon the rotating spool to serve as a brake upon the speed of the latter. Normally when the spool is at rest or when the line is running out, as just described, the finger-grip 3 of a handle or actuating means constructed in accordance with my invention will revolve in a circle the radius of which is indicated by the distance between the pivot 4 and the center of the finger-grip in its full-line position, Fig. 1. Also when the slack is being wound in the operator may rotate the finger-grip in this circle of small radius, thereby securing a high speed of the spool through the usual multiplying mechanism within the reel-plate and not illustrated. When, however, there is resistance to the winding in, in accordance with my invention the radius of the circle in which the finger-grip portion of the handle moves will be considerably increased, with consequent increase in leverage of the handle, this increase in the instance illustrated bringing the finger-grip portion to the dotted-line arc of Fig. 1. The means illustrated in the figures under description to accomplish this adjustment or variability of leverage comprise an attaching member 5 of suitable shape, which shape takes the form of a circular disk with a squared hole 6, located eccentrically, to receive the usual squared head of the winding-spindle 7 of the reel, a set-screw or other suitable fastening means 8 serving to hold the attaching member in place, it being convenient, though not necessary, to utilize the standard devices found on reels at present in the market to save the expense of alteration therein. Connected with said attaching member is an operating member 9, capable of adjustment to secure variable leverage, this operating member carrying the finger-grip 3 of the usual form and consisting of a peripheral strap of which the part 10 is secured removably, as by screws 11, permitting the parts to be readily separated.

It will be seen readily that upon rotation of the operating member relatively to the attaching member the finger-grip will move in an ellipse around the pivotal point 4 and when at the point most distant from the pivotal point will have the greatest leverage.

As means to control the operation of the members relatively to each other I have shown a spring 12, (see Fig. 4,) coiled around a stud 13 on the attaching member and engaging the strap member, as indicated, the effect of the spring being to maintain the members in the position of smallest leverage, which is the full-line position of Fig. 1, while against the action of this spring when the strain upon the spool is sufficiently great the fingers of the operator can move the strap or handle member around on the disk into the position shown in Fig. 4, the range of movement preferably being limited by suitable stops—as, for example, the projections 14 and 15, shown as formed integrally with the removble part 10 of the strap and engaging, respectively, the screw 8. It will thus be seen that as the finger-grip moves with such a short radius during paying out of the line there will be no danger of injury to the fingers of the operator through interference with its movements, the operator being enabled to grasp the base of the reel closely with the forefinger adjacent the periphery of the reel, applying his thumb to the drag in the usual manner well understood to all skilled in the art. He can, moreover, as already set forth, wind in slack quickly, but as soon as the strain comes on the line will have automatically the assistance of the greater leverage. Many modifications of the means for securing these advantages will occur to those skilled in the art, and I have shown in Figs. 5 to 7 one such modification, in which the attaching member is shown as a two-armed lever 16, to which the handle member 17 is attached by screws 18, with nuts 19, the shanks of the screws playing in slots 20 in the lever, which slots are curved to cause outward movement of the lever under a vigorous winding pressure, a spring 21 serving to retract the handle member when the strain is released.

Having described my invention thus fully, I wish it understood that I do not limit myself to the specific construction illustrated and described, nor in general otherwise than as set forth in the claims.

What I claim, and desire to secure by Letters Patent, is—

1. An actuating device for fishing-reels; comprising a lever of variable length; and means to vary automatically the length of said lever to increase the power thereof when a strain of predetermined strength is brought to bear on said reel during the operation of winding in.

2. An actuating device for fishing-reels; comprising an attaching member to be connected with the winding mechanism of the reel; an operating member connected with said attaching member and capable of adjustment to secure variable leverage; and means acting automatically to lower the leverage during the operation of paying out the line from said reel, and to increase the leverage during the operation of winding in the line under strain.

3. An actuating device for fishing-reels; comprising a disk member rotatable about an eccentric axis; and a handle member carried by said disk and provided with a finger-grip, said handle member being movable around the periphery of said disk member to vary the leverage of said actuating device and means acting automatically to lower the leverage during the operation of paying out the line from said reel, and to increase the leverage during the operation of winding in the line under strain.

4. As an article of manufacture; an actuating device for fishing-reels; comprising a disk member provided with an eccentric pivot-hole to receive the usual winding-post; a peripheral strap rotatable on said disk and provided with a finger-grip; and means to secure said strap removably to said disk.

5. An actuating device for reels; comprising a disk rotatable about an eccentric axis; a peripheral strap rotatable on said disk and provided with a finger-grip; and a spring, tending normally to hold said finger-grip in a position relatively near said axis.

6. An actuating device for reels; comprising a disk rotatable about an eccentric axis; a peripheral strap composed of a plurality of members embracing said disk and removable therefrom, said members being provided with a finger-grip; means to secure said members together; stop devices intermediate, and to limit the relative movement of said disk and strap; and a spring tending normally to hold said strap in position with said finger-grip relatively near said axis.

7. An actuating device for fishing-reels, comprising a lever having a plurality of members; and means acting automatically to dispose said members in balance around the fulcrum when the strain on said reel is relatively light, and on one side of the fulcrum when said strain increases, substantially as described.

8. A variable power-handle for fishing-reels; comprising a compound lever; and retractile means acting automatically to draw the members of said lever into position normally to rotate in an arc approximately within the limits of the periphery of said reel, substantially as described.

Signed at New York, in the county of New York and State of New York, this 23d day of January, A. D. 1902.

JOHN HOWARD ADAMS.

Witnesses:
ALEXANDER C. PROUDFIT,
HARRY H. WALTON.